(12) United States Patent
Miller

(10) Patent No.: US 6,505,698 B1
(45) Date of Patent: Jan. 14, 2003

(54) END-WEIGHTED VEHICLE

(76) Inventor: Randy L. Miller, 500 N. Gila Springs Blvd., No. 134, Chandler, AZ (US) 85226-2731

( * ) Notice: Subject to any disclaimer, the term of this patent is extended or adjusted under 35 U.S.C. 154(b) by 0 days.

(21) Appl. No.: 09/798,086

(22) Filed: Mar. 2, 2001

Related U.S. Application Data
(60) Provisional application No. 60/187,692, filed on Mar. 6, 2000.

(51) Int. Cl.$^7$ .............................................. B62D 61/12
(52) U.S. Cl. ........................... 180/219; 180/10; 180/21; 180/65.5; 280/205
(58) Field of Search ........................... 180/20, 21, 209, 180/219, 65.5, 19.1, 291, 205; 280/217, 219, 208, 205, 757, 758, 759

(56) References Cited

U.S. PATENT DOCUMENTS

| | | | |
|---|---|---|---|
| 917,590 A | * | 4/1909 | Grafft |
| 1,228,100 A | * | 5/1917 | D'Harlingue |
| 1,299,178 A | * | 4/1919 | Hanson |
| 1,357,571 A | * | 11/1920 | Knepper |
| 1,811,394 A | * | 6/1931 | Hornsby |
| 2,107,766 A | * | 2/1938 | Rose |
| 2,549,182 A | * | 4/1951 | Ekenstam |
| 3,016,967 A | * | 1/1962 | Rehfeld |
| 3,386,753 A | * | 6/1968 | Quedreux ................... 280/208 |
| 4,109,741 A | * | 8/1978 | Gabriel ........................ 180/21 |
| 4,253,535 A | * | 3/1981 | Kleine et al. .............. 180/6.24 |
| 4,324,413 A | * | 4/1982 | Bensette et al. ............ 280/205 |
| 4,861,053 A | * | 8/1989 | Yeomans, Jr. ............... 280/205 |
| 5,314,034 A | * | 5/1994 | Chittal ......................... 180/21 |
| 5,370,410 A | * | 12/1994 | Heijman ..................... 280/206 |

* cited by examiner

Primary Examiner—Anne Marie Boehler
(74) Attorney, Agent, or Firm—Parsons & Goltry

(57) ABSTRACT

An end-weighted vehicle comprising a framework having opposing ends and a wheel mounted to one of the ends for rotation and defining a footprint, and a weight supported by the framework proximate the wheel so as not to interfere with the rotation of the wheel, wherein a) the weight is sufficiently heavy and sufficiently distributed proximate the wheel so that the framework is forced to reside in an inclined position with the other of the ends positioned above a supporting surface when the wheel is positioned against the supporting surface, and b) the footprint is of a size sufficient to support and maintain the framework in the inclined condition.

4 Claims, 6 Drawing Sheets

END-WEIGHTED VEHICLE

This application claims the benefit of Provisional Application No. 60/187,692, filed Mar. 6, 2000.

FIELD OF THE INVENTION

This invention relates to vehicles and, more particularly, to end-weighted vehicles and to associated methods of constructing and arranging wheeled vehicles.

BACKGROUND OF THE INVENTION

A vehicle is generally any device or structure for transporting persons or things. One type of vehicle is the wheeled passenger vehicle. Of the many types of wheeled passenger vehicles are cars, trucks, buses and motorcycles. Since the advent of the motorized passenger vehicle, skilled artisans have devoted considerable time, effort and resources toward improving not only the mechanical technical attributes of motorized travel, but also to the various apparatus and designs that concern aesthetic beauty and driver and passenger comfort and safety. Given the interest many young children often have in toys made to resemble race cars, motorcycles, tractors and other wheeled vehicle forms, artisans devoted to the toy industry also invest considerable resources toward the development of interesting and pleasing toy vehicles that often are equipped with drive assemblies or motors, which, in some cases, are adapted and arranged to be actuated and controlled with the use of a remote control. Given that the art directed toward passenger and toy vehicles is a continually advancing one, it is inevitable that faithful artisans will continue to explore the nature of the art in the pursuit of improving upon it.

In this spirit, there is a need for an improved wheeled vehicle form that is easy to construct and that incorporates an end-weighted wheeled structure, which is adapted and arranged to cause the vehicle to rest and move in a unique and interesting fashion and which is especially adapted for the toy and recreational vehicle industries.

SUMMARY OF THE INVENTION

The above problems and others are at least partially solved and the above purposes and others realized in a new and improved end-weighted vehicle comprising a framework having opposing ends and a wheel mounted to one of the ends for rotation and defining a footprint. A weight is supported by the framework proximate the wheel so as not to interfere with the rotation of the wheel. The weight is sufficiently heavy and sufficiently distributed proximate the wheel so that the framework is forced to reside in an inclined position with the other of the ends positioned above a supporting surface when the wheel is positioned against the supporting surface. The footprint is of a size sufficient to support and maintain the framework in the, inclined condition. Another wheel may also be mounted to the framework at the other of the opposing ends. In a preferred embodiment, the vehicle bears resemblance generally to a motorcycle, and yet it may be configured to resemble other wheeled vehicle forms.

In accordance with a preferred embodiment, the weight is located within the wheel and the wheel is mounted for rotation to ends of an axle of the framework. The wheel functions essentially as a housing for the weight. The weight is preferably supported by and affixed to the axle between the ends of the axle. The wheel is associated with a drive assembly carried by the framework for driving the wheel for rotation. The drive assembly may be non-motorized or motorized.

Consistent with the foregoing, the invention also contemplates associated methods.

BRIEF DESCRIPTION OF THE DRAWINGS

Referring to the drawings.

DETAILED DESCRIPTION OF A PREFERRED EMBODIMENT

Figure 1:
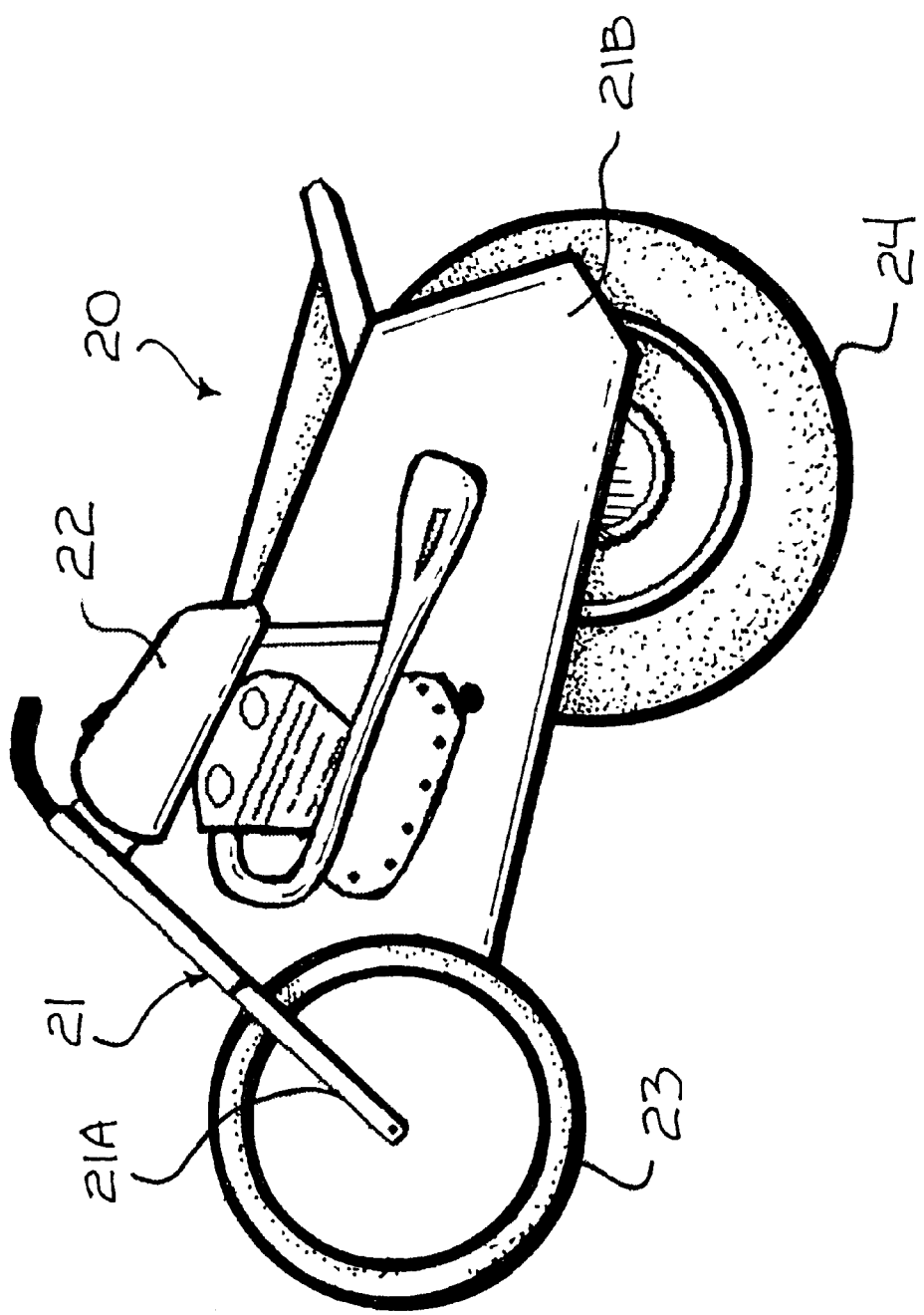
FIG. 1 illustrates an end-weighted vehicle having a body supported by a framework having attached front and rear wheels, in accordance with the invention.

Turning to the drawings, in which like reference characters indicate corresponding elements throughout the several views, attention is first directed to FIG. 1, which illustrates an end-weighted vehicle 20 constructed and arranged in accordance with the invention. Vehicle 20 is comprised of a framework 21 that supports a body 22 and wheels 23 and 24. Body 22 may be considered part of framework 21. Wheels 23 and 24 are supported at either end of framework 21. Wheel 23 is considered a front wheel, may be mounted to framework 21 for rotational movement or rigidly mounted, and is located at or near a forward end 21A of framework 21. Wheel 23 can, in a specific embodiment, be fixed to or assembled with framework 21 as a substantial integral feature of framework 21, such as through molding or the like. Wheel 24 is considered a rear wheel, is mounted to framework 21 for rotational movement, and is located at or near a rearward end 21B of framework 21. Although only two wheels are shown, more may be employed if desired. Vehicle 20 bears resemblance to a typical motorcycle. Depending on how many wheels vehicle 20 employs, vehicle 20 may be made to resemble other wheeled vehicle forms. Vehicle 20 may be constructed of a size sufficient to accommodate an average adult human occupant, or of a smaller size such as that of a child's toy.

Figure 3:
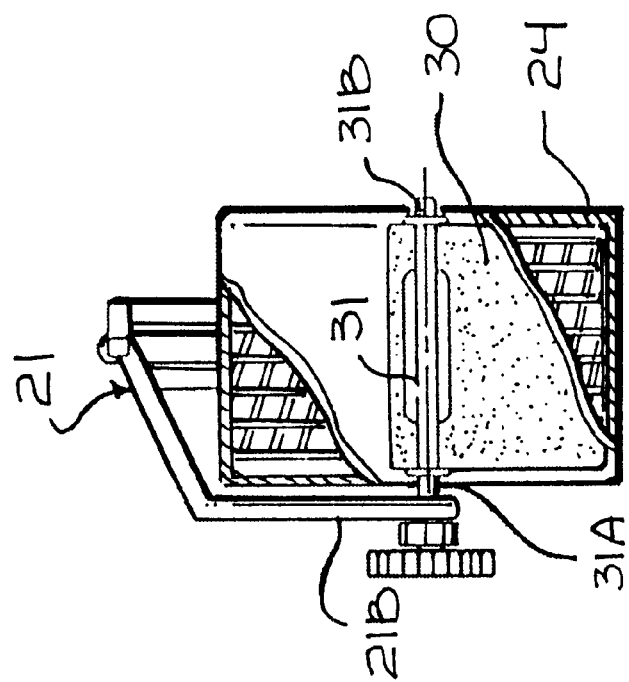
FIG. 3 illustrates the rear wheel of FIG. 2 with portions thereof broken away for the purpose of illustrating the weight located therein.
Figure 2:
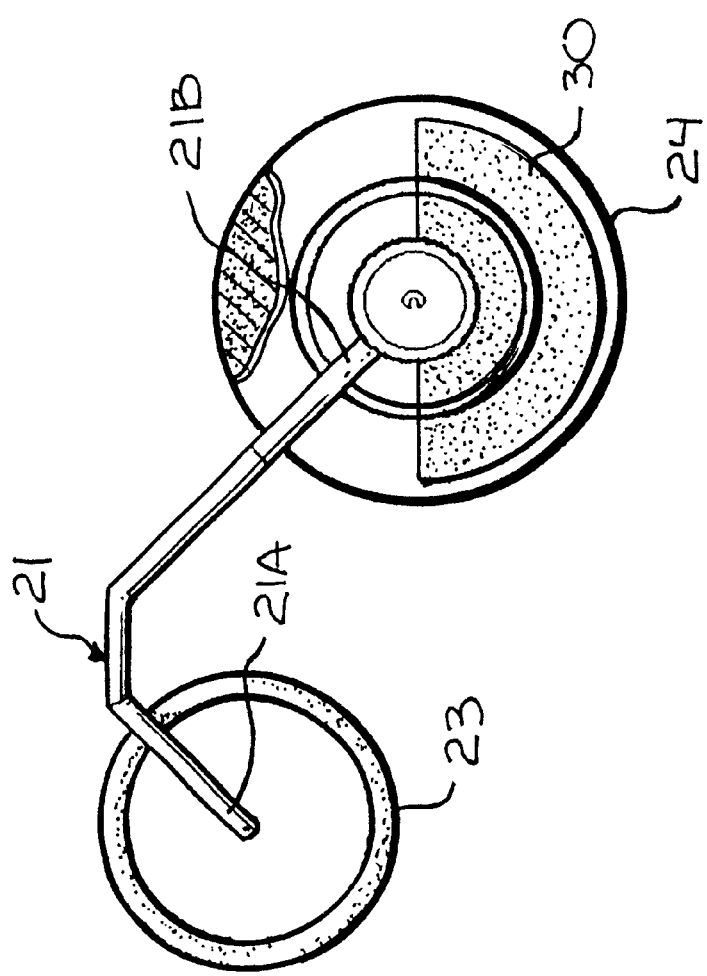
FIG. 2 illustrates a portion of the framework of FIG. 1 with a weight shown located within the rear wheel.

Regarding FIGS. 2 and 3, wheel 24 contains, partially or totally, a weight 30. Weight 30 is supported by and affixed to framework 21 and does not interfere with the rotational movement of wheel 24. Looking specifically to FIG. 3, axle 31 is mounted to framework 21. Axle 31 includes ends 31A and 31B and extends through wheel 24 centrally or otherwise at the radial midpoint thereof. Wheel 24 is mounted for rotation or otherwise journaled to axle 31 at or near each one of ends 31A and 31B. Axle 31 is considered part of framework 21 and is a fixed element and weight 30 is suspended from axle 31 between ends 31A and 31B. Weight 30 is fixed to axle 31, preferably by a keyed or other form of fixed engagement, and is sufficiently heavy and is affixed to axle 31 in a manner that sufficiently distributes the load of weight 30 in response to the natural force of gravity so that wheel 23 is forced to reside above a supporting surface when wheel 24 is positioned against the supporting surface. The footprint defined by wheel 24 is of a size sufficient to support and maintain vehicle 20 in this inclined condition whether in a resting condition or when engaged in wheeled movement over a supporting surface. The angle of inclination of vehicle 20 can be controlled, varied or otherwise provided at any desired angle depending on the heaviness of weight 30 and/or the distribution of weight 30 in relationship to framework 21.

Figure 4:
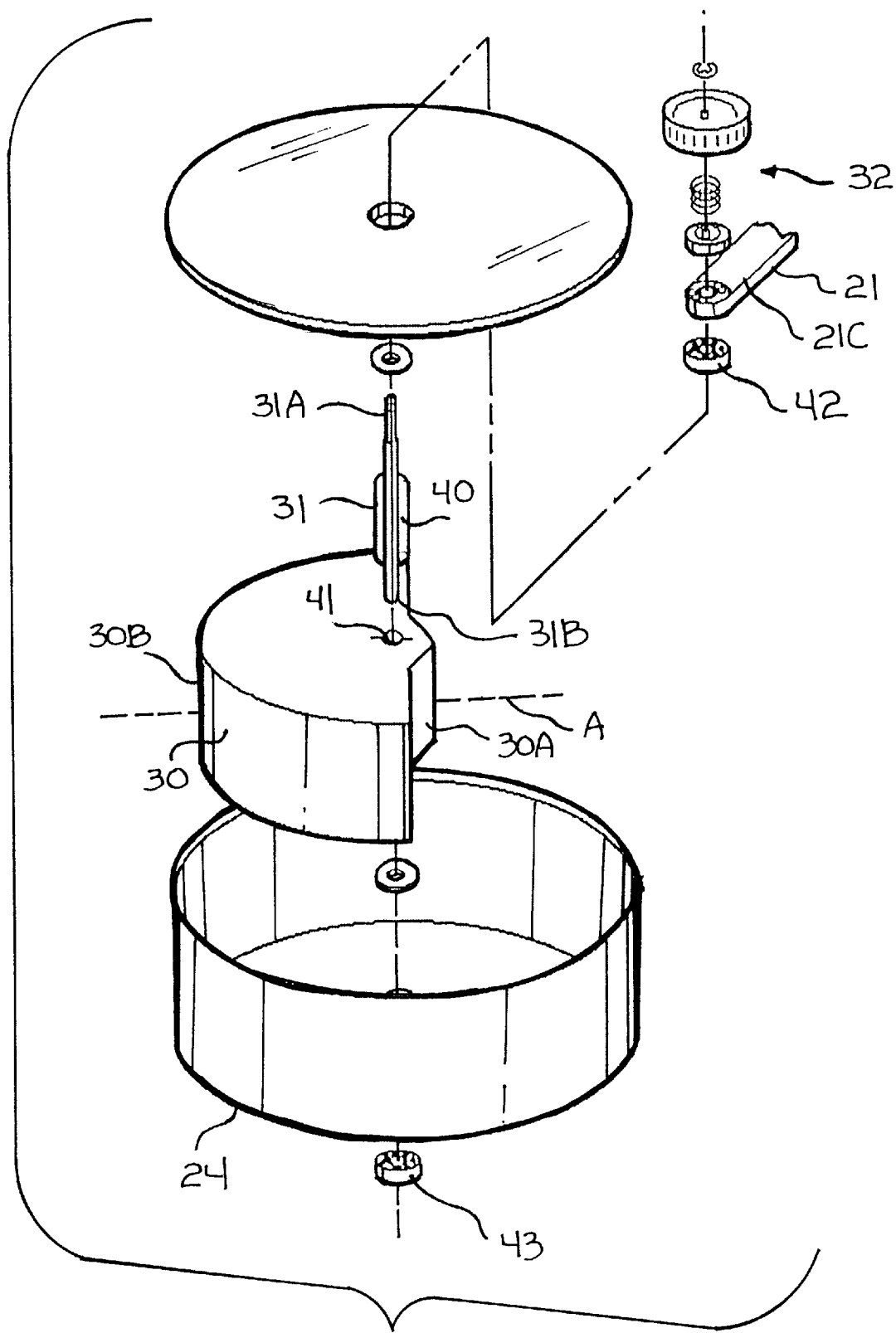
FIG. 4 is an exploded view of the rear wheel of FIG. 1 and associated apparatus for coupling the rear wheel to the framework.
Figure 5:
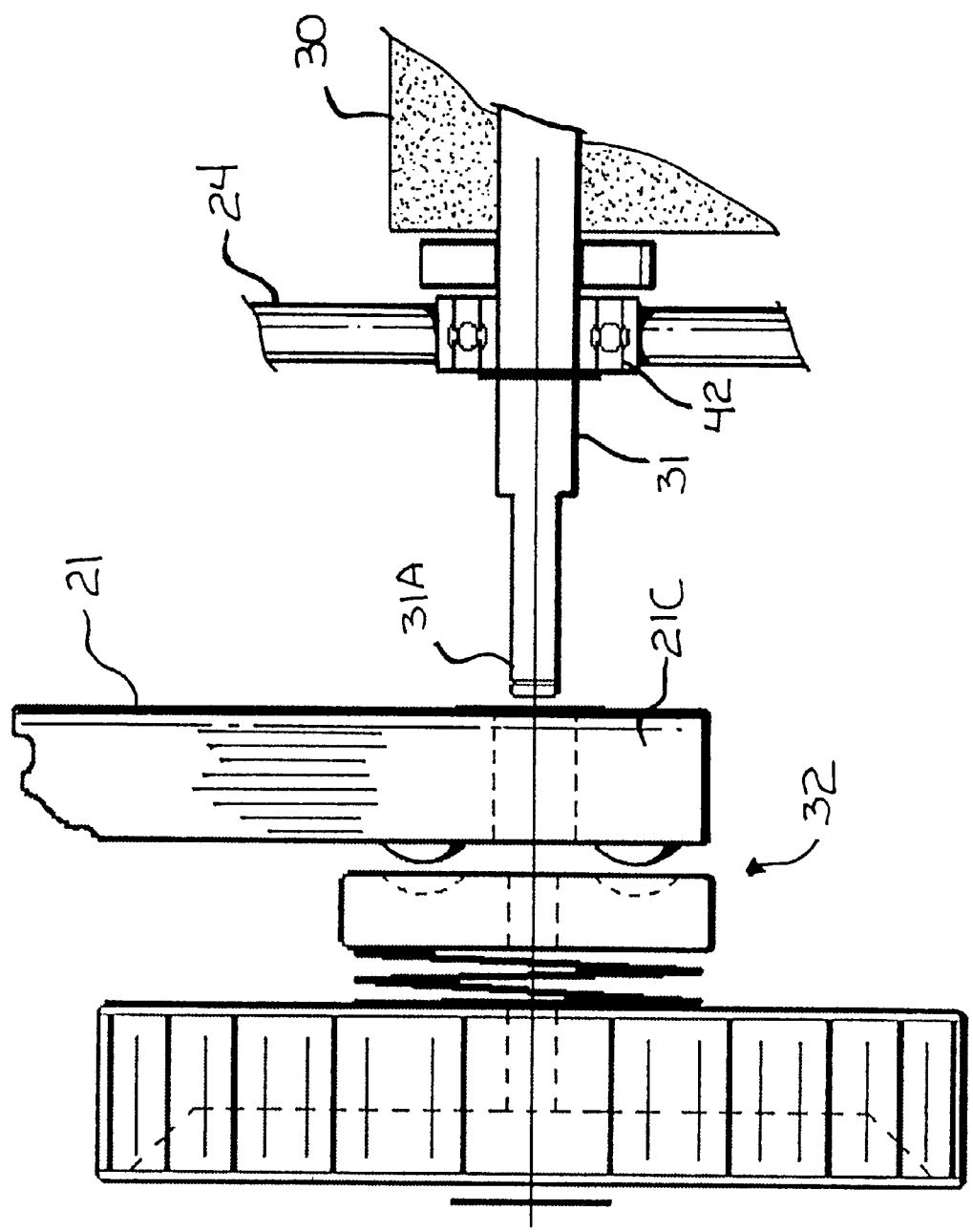
FIG. 5 illustrates the apparatus of FIG. 4 as it would appear partially assembled.
Figure 6:
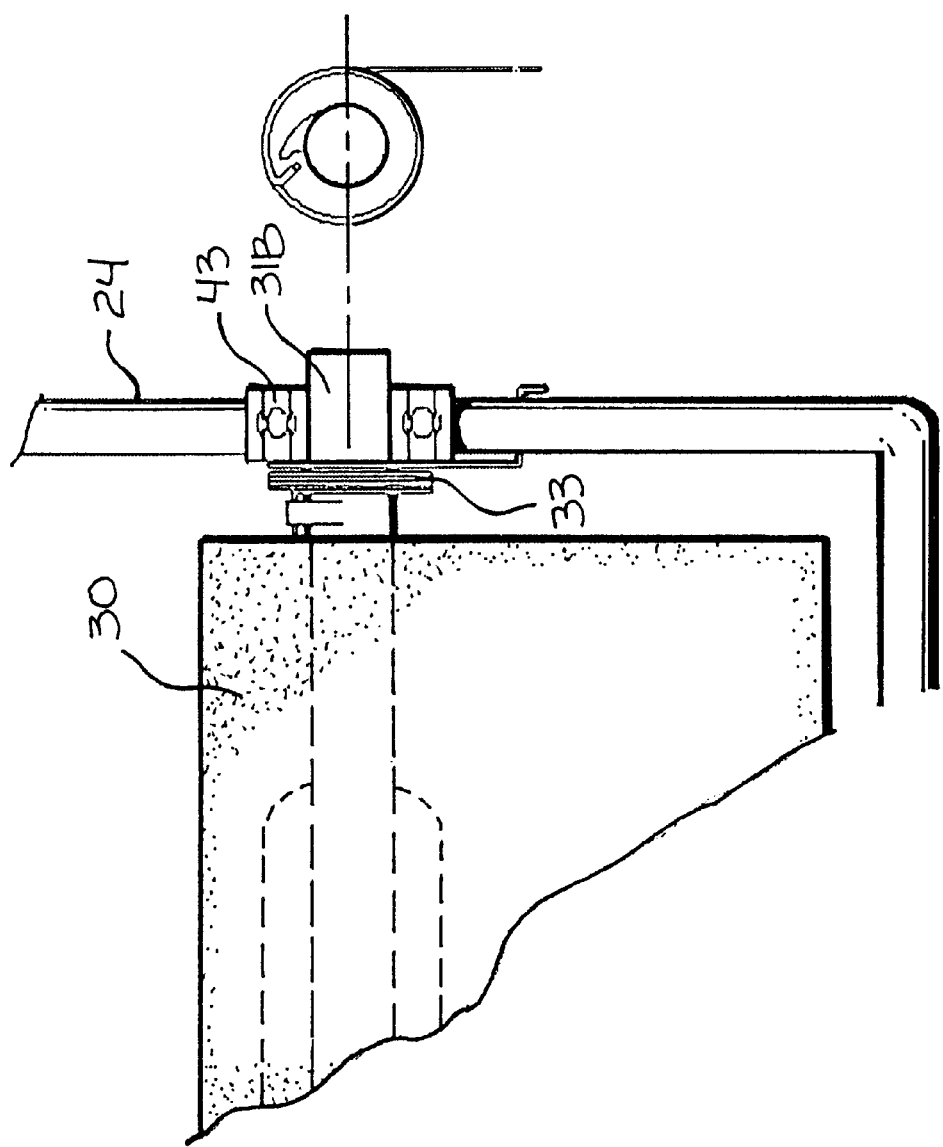
FIG. 6 illustrates a drive assembly for driving the rear wheel of the vehicle of FIG. 1.

As a matter of example, FIG. 4 shows a preferred assembly of wheel 24 and weight 30 in addition to apparatus 32 for attaching axle 31 to framework 21. FIG. 5 illustrates an enlarged view of apparatus 32 as it would appear partially assembled. In FIG. 4, axle 31 is shown fashioned with a central key 40, which is located between ends 31A and 31B. A keyed opening 41 extends through weight 31 at its midline axis A and toward its upper end 30A, which, of course, opposes its lower end 30B. Regarding FIGS. 4 and 5, axle 30 passes into and through keyed opening 41, and key 40 and keyed opening 41 complement one another and provided a keyed and substantially fixed attachment. Ends 31A and 31B reside outboard of either side of weight 30 and are each coupled to wheel 24 for rotation. In the specific embodiment shown, end 31A passes into and through a bearing 42, an extension 21C of framework 21 and terminates with apparatus 32. Bearing 42 is fastened to one side of wheel 24 on one side of extension 21A, and apparatus 32 is located on the opposing side of extension 21C as substantially shown. Bearing 42 is either fixed to wheel 24 and adapted and arranged to rotate relative to axle, or is fixed to axle 30 and adapted and arranged to allow wheel 24 to rotate relative to it, and whichever way is employed is simply a matter of preference. Apparatus 32 is adapted and arranged to engage and couple end 31A so as to form a secure coupling with extension 21C of framework. Apparatus 32 may comprise a variety of threaded couplings, a snap attachment assembly or any other suitable engagement element or combination of elements operative for securing end 31A so as to form a secure coupling with extension 21C of framework 21. Apparatus 32 is preferably adjustable between loosened and tightened or secured conditions. In the loosened condition of apparatus 32 the distribution of weight 30 relative to framework 21 can be changed by pivoting, shifting or otherwise rotating axle to a desired position, after which apparatus 32 may be moved back into the tightened or secured condition. By altering the distribution of weight 30 in relation to framework 21 in this manner, the angle of inclination of vehicle 20 can be controlled. In FIG. 6, end 31B is shown mounted to wheel 24 with a bearing 43, which is substantially similar to bearing 42.

Figure 7:
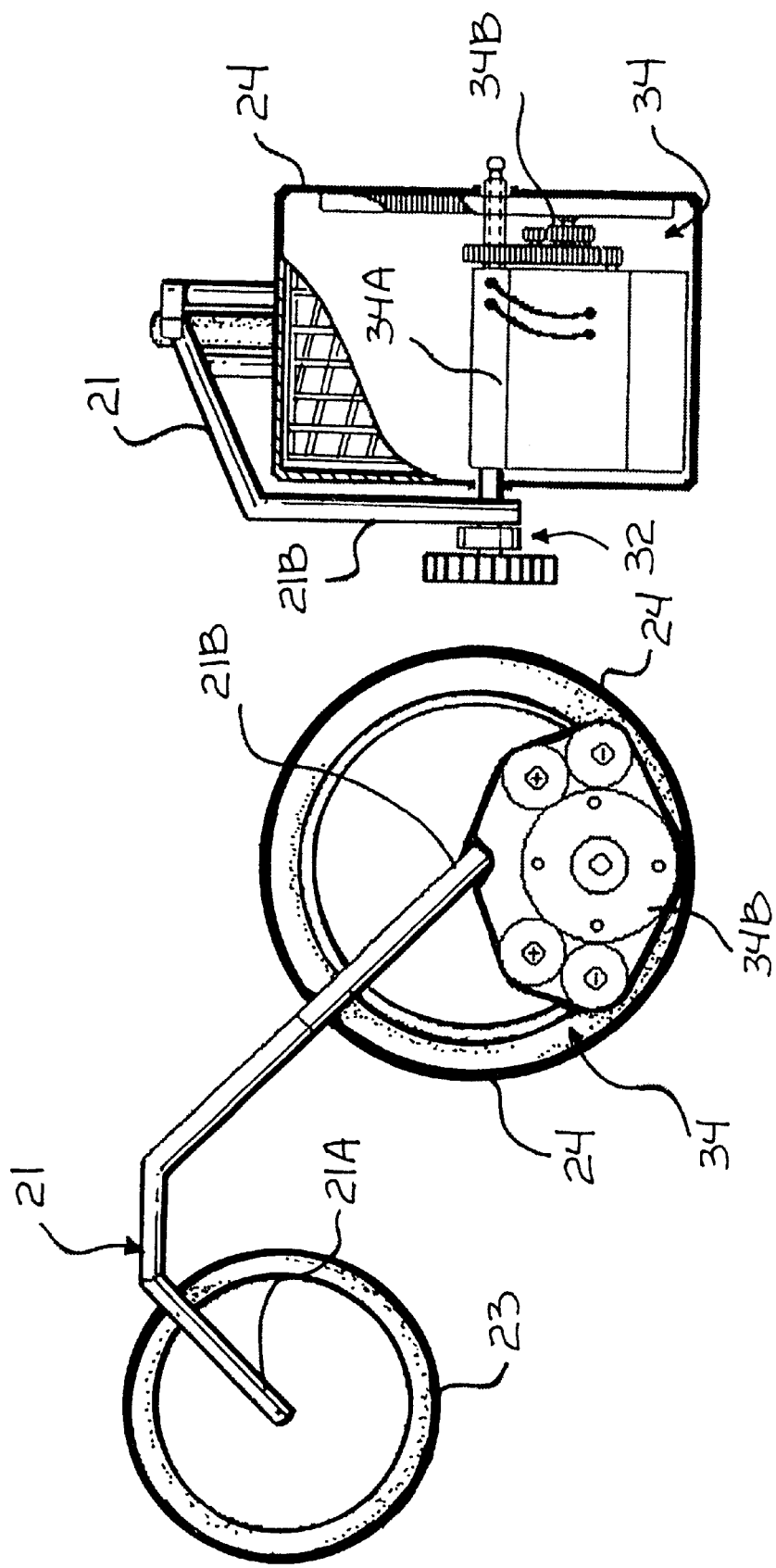
FIG. 7 illustrates another embodiment of a drive assembly for driving the rear wheel of the vehicle of FIG. 1.

If desired, the invention may be equipped with a motorized or non-motorized drive assembly for driving wheel 24 over a supporting surface. As a matter of example, FIG. 6 illustrates a spring 33 mounted so as to encircle axle 31 adjacent end 31B in a wound condition as substantially shown. Although spring 33 is located within wheel 24, it may be located outside of wheel 24 if desired. Spring 33 has a free end 33A attached or otherwise fixed to axle 31 and another free end 33B attached or otherwise fixed to wheel 25. A bias may be introduced into spring 33 by engaging and turning wheel 24 either in the clockwise or counter clockwise direction. After introducing a bias into spring 33, release of wheel 24 will cause it to forcibly rotate until the bias in spring 33 diminishes. In another embodiment, FIG. 7 shows a motorized drive assembly 34 that incorporates a motor 34A and a pinion or gear assembly 34B for driving wheel 24. In this embodiment, motor 34A may comprise a fuel- or battery-powered motor and may further define all or at least part of weight 30.

The invention has been described above with reference to one or more preferred embodiments. However, those skilled in the art will recognize that changes and modifications, whether known in the art or novel, may be made to the described embodiments without departing from the nature and scope of the claimed invention, and that operations and engagement pairs may be reversed. Accordingly, any such changes and modifications to one or more of the embodiments herein chosen for purposes of illustration are intended to be included within the scope of the invention as assessed only by a fair and reasonable interpretation of the ensuing claims.

Having fully described the invention in such clear and concise terms as to enable those skilled in the art to understand and practice the same, the invention claimed is:

What is claimed is:

1. An end-weighted vehicle comprising:

a framework having opposing ends and a wheel mounted to one of the ends for rotation and defining a footprint;

a weight supported by the framework and substantially contained by the wheel so as not to interfere with the rotation of the wheel, the wheel being mounted for rotation to ends of an axle of the framework and the weight being fixedly attached to the axle between the ends of the axle, wherein a) the weight is sufficiently heavy and sufficiently distributed proximate the wheel so that the framework is forced to reside in an inclined position with the other of the ends positioned above a supporting surface when the wheel is positioned against the supporting surface, and b) the footprint is of a size sufficient to support and maintain the framework in the inclined condition; and adjustment mechanism coupling the axle to the frame and adjustable between a loosened condition wherein the axle is rotatable with respect to the frame, allowing the orientation of the frame with respect to the weight carried by the axle to be altered, thereby adjusting the inclined position, and a secured condition wherein the axle is fixed with respect to the frame.

2. The vehicle of claim 1, wherein the wheel is associated with a drive assembly carried by the framework for driving the wheel for rotation.

3. The vehicle of claim 2, wherein the drive assembly is non-motorized.

4. The vehicle of claim 2, wherein the drive assembly is motorized.

* * * * *